(12) United States Patent
Rizzon et al.

(10) Patent No.: US 9,883,632 B2
(45) Date of Patent: Feb. 6, 2018

(54) STRAP GRIPPER FOR AN AGRICULTURAL BALER

(71) Applicant: CNH Industrial America LLC, New Holland, PA (US)

(72) Inventors: Dominick Brian Rizzon, Ephrata, PA (US); Joshua Lee Lounder, Ephrata, PA (US); Robert D. Crandall, Lancaster, PA (US); Shaun Ahrens O'Donnell, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/301,044

(22) PCT Filed: Mar. 26, 2015

(86) PCT No.: PCT/US2015/022842
§ 371 (c)(1),
(2) Date: Sep. 30, 2016

(87) PCT Pub. No.: WO2015/153299
PCT Pub. Date: Oct. 8, 2015

(65) Prior Publication Data
US 2017/0020077 A1 Jan. 26, 2017

Related U.S. Application Data

(60) Provisional application No. 61/973,049, filed on Mar. 31, 2014.

(51) Int. Cl.
B65B 13/02 (2006.01)
B65B 13/18 (2006.01)
(Continued)

(52) U.S. Cl.
CPC ............. *A01F 15/12* (2013.01); *A01F 15/14* (2013.01); *B65B 13/02* (2013.01); *B65B 13/187* (2013.01);
(Continued)

(58) Field of Classification Search
CPC ........ A01F 15/04; A01F 15/042; A01F 15/12; A01F 15/14; B65B 13/02; B65B 13/187; B65B 13/26; B65B 13/32; B65B 27/12
See application file for complete search history.

(56) References Cited

U.S. PATENT DOCUMENTS 2,416,859 A 3/1947 Vining et al.
2,831,422 A 4/1958 Black et al.
(Continued)

FOREIGN PATENT DOCUMENTS

DE 3216883 A1 11/1983
FR 2254483 A1 7/1975
FR 2676611 A1 11/1992

*Primary Examiner* — Jimmy T Nguyen
(74) *Attorney, Agent, or Firm* — Peter K. Zacharias

(57) ABSTRACT

An agricultural baler including a sealing assembly positioned adjacent to a baling chamber. The sealing assembly is configured to receive a strap and to seal the strap into a loop around compressible material within the baling chamber to form a strapped bale. The agricultural baler also includes a strap gripper positioned adjacent to the sealing assembly. In some embodiments, the strap gripper includes a pivot plate, a guide wheel rotatably coupled to the pivot plate, and a drive wheel. The pivot plate is biased to rotate about an axis in a first direction to urge the guide wheel toward the drive wheel, and the drive wheel and the guide wheel are configured to receive the strap after the strap is looped around the compressible material, to block movement of the strap away from the sealing assembly, and to drive the strap toward the sealing assembly.

10 Claims, 6 Drawing Sheets

(51) Int. Cl.
*B65B 27/12* (2006.01)
*A01F 15/12* (2006.01)
*A01F 15/14* (2006.01)
*B65B 13/32* (2006.01)
*A01F 15/04* (2006.01)

(52) U.S. Cl.
CPC .............. *B65B 13/32* (2013.01); *B65B 27/12* (2013.01); *A01F 15/042* (2013.01)

(56) References Cited

U.S. PATENT DOCUMENTS

| | | |
|---|---|---|
| 3,450,028 A | 6/1969 | Goland et al. |
| 4,177,724 A | 12/1979 | Johnson, III et al. |
| 5,377,477 A | 1/1995 | Haberstroh et al. |
| 5,379,576 A * | 1/1995 | Koyama ................. B65B 13/22 100/26 |
| 5,450,787 A | 9/1995 | Horchler |
| 5,509,594 A * | 4/1996 | Maggioni ............... B65B 13/22 100/32 |
| 6,035,774 A | 3/2000 | Fischer |
| 6,463,848 B1 * | 10/2002 | Haberstroh ............ B65B 13/04 100/26 |
| 6,742,323 B2 | 6/2004 | Apel et al. |
| 7,165,379 B1 * | 1/2007 | Lai .......................... B65B 13/22 100/26 |
| 8,770,101 B2 | 7/2014 | Van Groenigen |

\* cited by examiner

STRAP GRIPPER FOR AN AGRICULTURAL BALER

CROSS REFERENCE TO RELATED APPLICATION

This application claims priority from and the benefit of U.S. Provisional Application Ser. No. 61/973,049, entitled "STRAP GRIPPER FOR AN AGRICULTURAL BALER," filed Mar. 31, 2014, which is hereby incorporated by reference in its entirety.

BACKGROUND

The present invention relates generally to the field of packaging compressible agricultural materials, and more particularly, to a system for strapping bales of crop materials.

Generally, rectangular or square balers are utilized to compress certain materials into rectangular bales to facilitate storage and handling of the material. Usually, the material is compressed within a baling chamber until the material forms a bale of a desired size. Such balers typically include a mechanism for wrapping and knotting twine around the material to maintain the compressed shape of the bale. Unfortunately, twine may be difficult to remove from the bale during subsequent processing operations. In addition, the tensile strength of twine may be too low to effectively bind compressed materials in certain applications.

BRIEF DESCRIPTION

In one embodiment, an agricultural baler includes a sealing assembly positioned adjacent to a baling chamber. The sealing assembly is configured to receive a strap and to seal the strap into a loop around compressible material within the baling chamber to form a strapped bale. The agricultural baler also includes a strap gripper positioned adjacent to the sealing assembly. In some embodiments, the strap gripper includes a pivot plate, a guide wheel rotatably coupled to the pivot plate, and a drive wheel. The pivot plate is biased to rotate about an axis in a first direction to urge the guide wheel toward the drive wheel, and the drive wheel and the guide wheel are configured to receive the strap after the strap is looped around the compressible material, to block movement of the strap away from the sealing assembly, and to drive the strap toward the sealing assembly.

In another embodiment, an agricultural baler includes a sealing assembly and a strap gripper. The strap gripper includes a drive wheel driven to rotate by a drive shaft and a pivot plate positioned adjacent to the drive wheel. The pivot plate is configured to rotate about an axis between an engagement position and a release position. The strap gripper also includes a guide wheel rotatably coupled to the pivot plate. In some embodiments, the guide wheel is positioned adjacent to the drive wheel while the pivot plate is in the engagement position, and while the pivot plate is in the engagement position, the strap gripper is configured to receive the strap between the drive wheel and the guide wheel, to block movement of the strap away from the sealing assembly, and to direct the strap toward the sealing assembly. The strap gripper further includes a biasing member coupled to the pivot plate and configured to urge the pivot plate to rotate about the axis toward the engagement position.

A method for baling an agricultural includes looping an end of a strap around at least a portion of a compressible agricultural crop. The method also includes transferring the end of the strap to a strap gripper while a pivot plate of the strap gripper is in an engagement position. The method further includes driving a drive wheel of the strap gripper to feed the end of the strap toward a sealing assembly. In some embodiments, the method also includes transferring the end of the strap to the sealing assembly. The method further includes moving the pivot plate of the strap gripper to a release position. The method also includes sealing the end of the strap to another portion of the strap with the sealing assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to a system and method for strapping a bale of agricultural material. In particular, a system for transferring a strap between various components in a baler is disclosed. For example, in certain embodiments, a strap gripper may be used to transfer a strap end between a needle and a sealing assembly. The strap gripper may mechanically grip and drive the strap end toward the sealing assembly. Moreover, the strap gripper may be configured to retain the strap between two opposing wheels, each having a textured surface. In addition, one wheel may include a one way bearing that blocks movement of the strap away from the sealing assembly. In certain embodiments, the strap gripper includes a pivot plate that rotates between an engagement position and a release position. One wheel is mounted on the pivot plate and rotates along with the pivot between the engagement position and the release position. In the engagement position, the strap gripper grips the strap between the wheels and directs the strap toward the sealing assembly. However, in the release position, one wheel rotates away from the other wheel and the strap gripper releases the strap as the strap is transferred to the sealing assembly.

Figure 1:
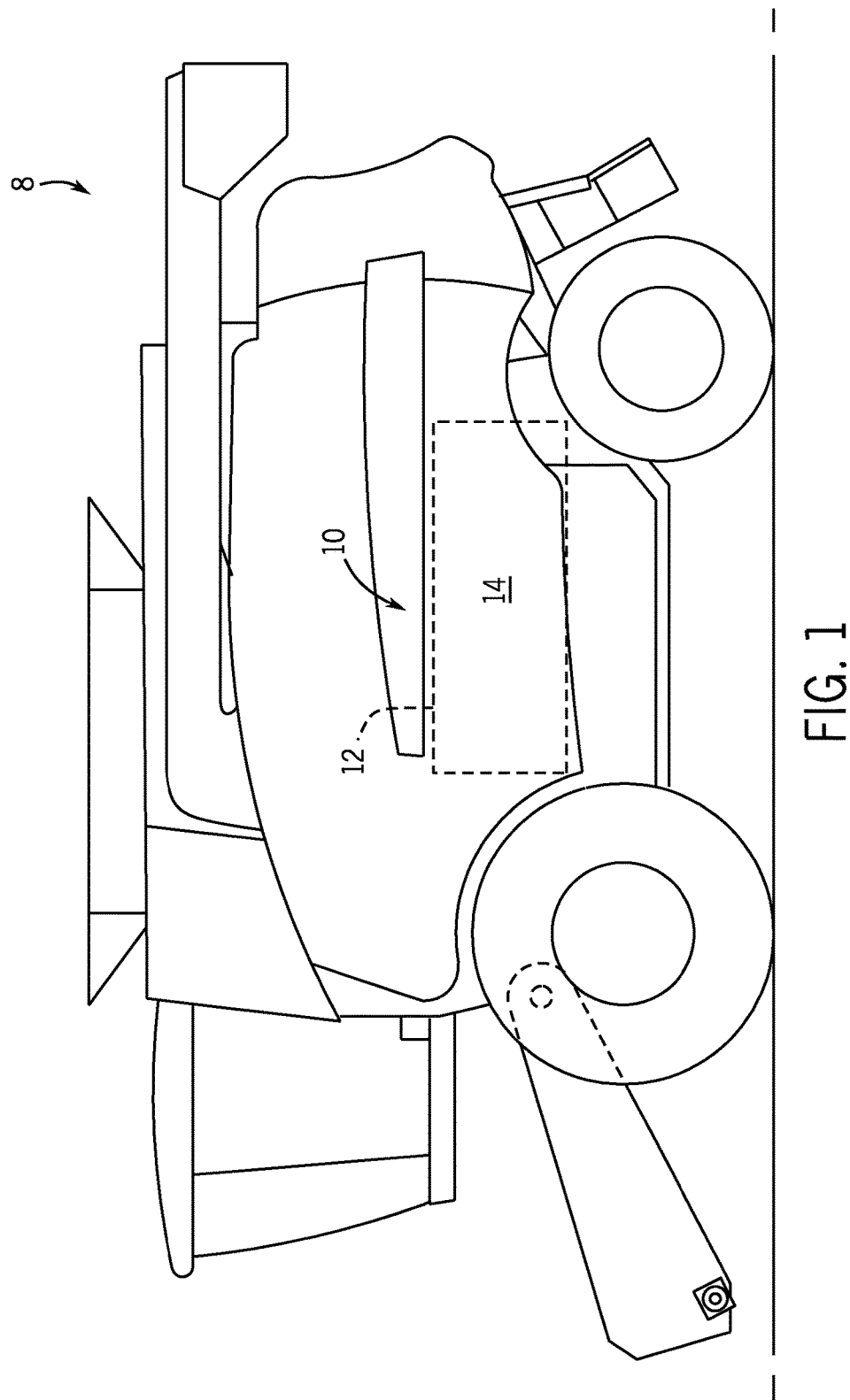
FIG. 1 is a side view of an embodiment of a self-contained vehicle including a baler.

Turning now to the drawings, FIG. 1 is a side view of a self-contained vehicle 8 having a baler 10. As illustrated, a frame 12 defines a baling chamber 14 that is supported and/or mounted within or on the self-contained vehicle 8. Material may flow into the baling chamber 14 via a conveyance system, where the material is baled in a manner described below. Thus, the baler 10 may be configured to collect and bale material as the self-contained vehicle 8 travels through the field.

Figure 2:
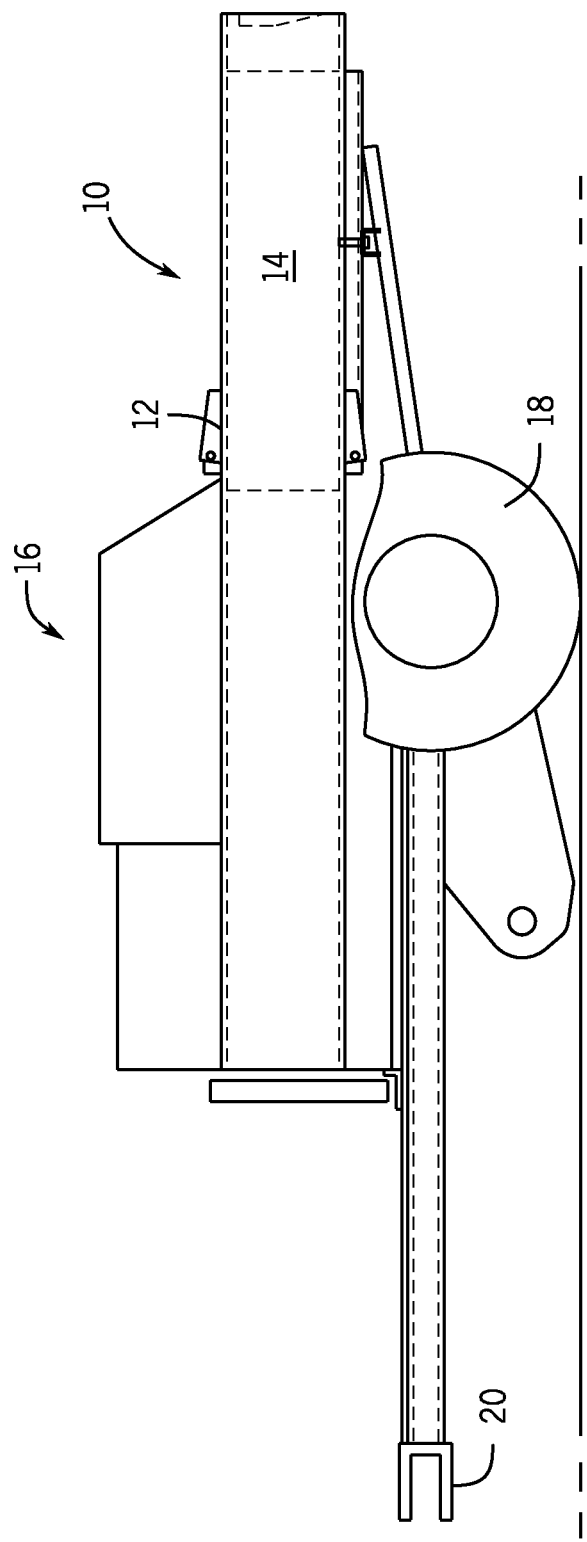
FIG. 2 is a side view of an embodiment of a towable implement having a baler, in which the towable implement is configured to be towed by a tow vehicle.

FIG. 2 is a side view of an embodiment of a towable implement 16 having the baler 10, in which the towable implement 16 is configured to be towed by a tow vehicle. As shown, the towable implement 16 includes the baler 10 having the baling chamber 14. The towable implement 16 may be ground-supported by wheels 18 and may be coupled to a tow vehicle (e.g., a harvester, a tractor, etc.) by a projection 20 that is configured to connect the towable implement 16 to the tow vehicle. Thus, the towable implement 16 may be pulled through a field. In such a configuration, the baler 10 collects and bales material as the towable implement 16 travels through the field behind the tow vehicle. It should be understood that the baler 10 disclosed herein may be incorporated in and/or utilized with any suitable implement or vehicle.

Figure 3:
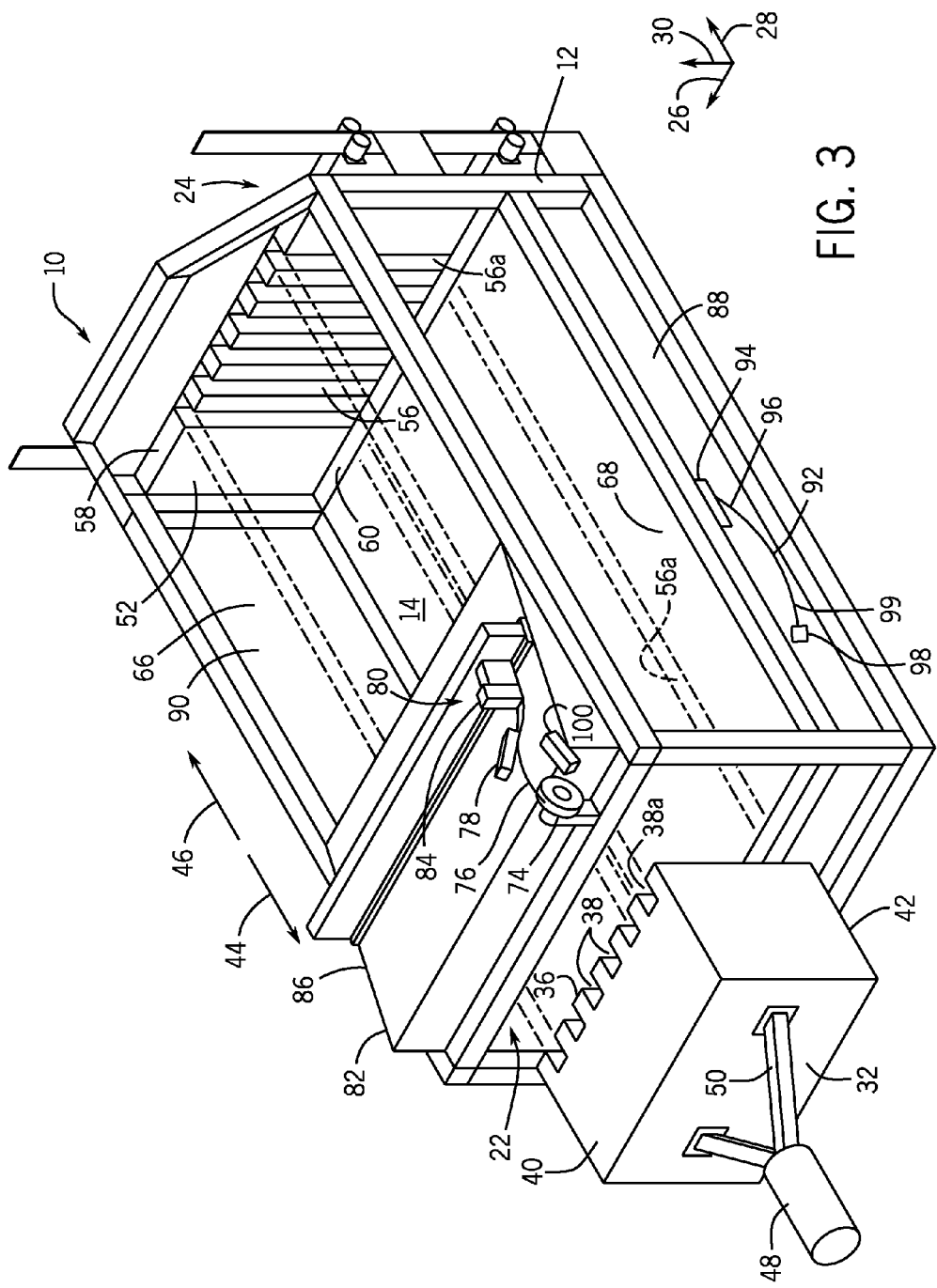
FIG. 3 is a perspective view of an embodiment of a portion of a baler configured to form and to strap rectangular bales of material.

FIG. 3 is a perspective view of an embodiment of a portion of the baler 10 configured to form and to strap rectangular bales of material (e.g., crop material, such as hay, straw, grasses, silage, corn stalks, tobacco, cotton, biomass, etc.). In the illustrated embodiment, the baler 10 includes the frame 12 defining the baling chamber 14. The baling chamber 14 includes a first end 22 (e.g., forward end) and a second end 24 (e.g., rear end), which may generally relate to the direction of travel of the baler 10. For example, the baler 10 may be coupled to the tow vehicle and pulled through a field, collecting and baling the crop material as the baler 10 travels through the field. When connected to the tow vehicle, the forward end 22 is proximal to the vehicle, while the rear end 24 is distal from the tow vehicle. The baler 10 may also be included in a self-propelled chassis, or may be part of the self-contained vehicle 8, as discussed above. The baler 10 and/or the baling chamber 14 may be further defined as having a lateral axis 26, a longitudinal axis 28, and a vertical axis 30. Although the illustrated embodiment includes a horizontal rectangular baler 10, it should be understood that the systems disclosed herein may be readily adapted for use in other types of balers 10, such as vertical balers. Additionally, although the illustrated embodiment includes a baler 10 configured to bind the bale around the lateral axis 26, in other embodiments the baler 10 may be configured to bind the bale around the longitudinal axis 28 and/or the vertical axis 30, as discussed in more detail below.

In the baler 10 of FIG. 3, the material enters the baling chamber 14 through the forward end 22, and the material is compressed within the baling chamber 14 by a forward plunger 32. The forward plunger 32 then moves axially (e.g., along the longitudinal axis 28) within the baling chamber 14 to drive the compressible material rearwardly toward the rear end 24. In the illustrated embodiment, the forward plunger 32 includes a material-facing surface 36. As shown, the forward plunger 32 includes multiple parallel slots 38 open to the baling chamber 14. The slots 38 extend from a first end 40 (e.g., top end) of the forward plunger 32 to a second end 42 (e.g., bottom end) of the forward plunger 32. The slots 38 are generally aligned with the vertical axis 30 of the baler 10 and are spaced apart from one another along the lateral axis 26 substantially evenly across the material-facing surface 36 of the forward plunger 32. As shown, six slots 38 are provided on the material-facing surface 36 of the forward plunger 32, although two, three, four, five, seven, eight, nine, ten, or more slots may be provided in other embodiments. It should be understood that the forward plunger 32 and the material-facing surface 36 of the forward plunger 32 may have any form suitable for compressing the material within the baling chamber 14. For example, the forward plunger 32 may include a series of separate, spaced apart bars, or in other embodiments, the forward plunger 32 may have a uniform, flat material-facing surface 36.

The forward plunger 32 is configured to move axially within the baling chamber 14 in a reciprocating motion along the longitudinal axis 28 of the baler 10. In other words, the forward plunger 32 is configured to move in a first direction 44 (e.g., forward direction or forwardly) and in a second direction 46 (e.g., rearward direction or rearwardly). In the illustrated embodiment, the forward plunger 32 is coupled to an actuator 48 via one or more arms 50. The actuator 48 may be a hydraulic cylinder or a pneumatic cylinder, or the actuator 48 may include a piston that drives a flywheel to power a gearbox. The gearbox may, in turn, rotate crank arms that are coupled to the arms 50, thereby facilitating motion of the forward plunger 32. Regardless of its form, the actuator 48 is configured to control the reciprocating motion of the forward plunger 32.

In the illustrated embodiment, the baler 10 includes a rear door 52 (e.g., a wall or a support structure) disposed at or near the rear end 24 of the baler 10 and opposite the forward plunger 32. As shown, the rear door 52 has multiple parallel tracks 56 configured to open toward the baling chamber 14. The tracks 56 extend from a first end 58 (e.g., top end) of the rear door 52 to a second end 60 (e.g., bottom end) of the rear door 52, and the tracks 56 are generally aligned with the vertical axis 30 of the baler 10. The tracks 56 are spaced apart from one another evenly across the rear door 52 along the lateral axis 26. Furthermore, each track 56 of the rear door 52 is disposed opposite (e.g., aligned with) one corresponding slot 38 of the forward plunger 32. In certain embodiments, the rear door 52 is moveable and is coupled to one or more actuators (e.g., hydraulic cylinders, pneumatic cylinders, etc.) configured to facilitate movement of the rear door 52. For example, the rear door 52 may be configured to move vertically (e.g., along the vertical axis 30) between a closed position that blocks the bale from exiting the baling chamber 14 and an open position that enables the bale to exit the baling chamber 14. In alternate embodiments, the rear door 52 may be configured to rotate relative to the baling chamber 14 to enable the bale to exit the baling chamber. In certain embodiments, the rear door 52 may be configured to move in a reciprocating manner along the longitudinal axis 28 of the baling chamber 14, and thus may be a rear plunger.

As shown in FIG. 3, the baling chamber 14 has a first wall 66 (e.g., a top wall) and a second wall 68 (e.g., a bottom wall), opposite the first wall 66. The first wall 66 and the second wall 68 extend generally between the forward plunger 32 and the rear door 52. In the illustrated embodiment, the first wall 66 and the second wall 68 have multiple parallel tracks 56 open toward the baling chamber 14. The tracks 56 disposed along the first wall 66 and the second wall 68 are positioned parallel to the longitudinal axis 28 of the baler 10. The tracks 56 disposed within the first wall 66 and the second wall 68 may extend along all or some of the length of the baling chamber 14 so as to accommodate the various axial positions of the forward plunger 32. The tracks 56 align with the slots 38 of the forward plunger 32 as the forward plunger 32 moves axially (e.g., along the longitudinal axis 28) within the baling chamber 14, as well as with the tracks 56 of the rear door 52, as discussed in more detail below.

Additionally, the slots 38 of the forward plunger 32 and the tracks 56 align with one another so as to surround, or substantially surround, the baling chamber 14. More specifically, the forward plunger 32 has a first slot 38a that aligns with a corresponding first track 56a of the first wall 66, the second wall 68, and the rear door 52 to substantially surround the baling chamber 14. As noted above, in some embodiments, two, three, four, five, six, or more slots 30 may be provided in the forward plunger 32, and a corresponding number of tracks 56 may be provided in the rear door 52, the first wall 66, and the second wall 68. As discussed in more detail below, the slots 38 and the tracks 56 are aligned to enable a strap to be directed or routed around the baling chamber 14 to strap the compressible material into a bale.

In the illustrated embodiment, the baler 10 includes a spool 74 configured to store and to provide a strap 76 (e.g., a band, a belt, a wire, or the like) for strapping the material within the baling chamber 14. In certain embodiments, the spool 74 may be accessible and/or removable to facilitate replacement and/or installation of the strap 76. As illustrated, the spool 74 provides the strap 76 to a strap feeding assembly 78, which is configured to direct and/or to propel the strap 76 around at least a portion of the baling chamber 14. For example, the strap feeding assembly 78 propels the strap 76 through at least a portion of the track 56 to surround at least a portion of the bale with the strap 76.

The baler 10 also includes a sealing assembly 80 having a sealing frame 82 and a sealing device 84. As discussed in more detail below, the sealing assembly 80 is configured to move relative to the baling chamber 14 to facilitate routing the strap 76 around the baling chamber 14 and/or to enable sealing of the strap 76 around the bale as the bale exits the baling chamber 14, for example. The sealing device 84 is configured to receive and/or to capture the strap 76, and to seal one portion of the strap 76 to another portion of the strap 76 to form the strap 76 into a sealed loop around the bale. Additionally, the sealing device 84 may be configured to cut the strap 76 and to grip the cut end of the strap 76 to facilitate strapping a subsequent bale. In some embodiments, the strap feeding assembly 78 may be aligned with the sealing device 84, enabling the strap 76 to be fed through the sealing device 84 and into an adjacent portion of the track 56 to facilitate surrounding the bale. In the illustrated embodiment, the strap feeding assembly 78 is integrated into the sealing assembly 80, and/or the sealing assembly 80 may be configured to propel the strap 76 around at least a portion of the baling chamber 14.

The sealing device 84 is coupled to the sealing frame 82 of the sealing assembly 80. The sealing frame 82 may have any suitable form for supporting the sealing device 82 and/or for facilitating movement of the sealing assembly 80 relative to the baling chamber 14. For example, as shown, the sealing frame 82 is positioned adjacent to the first wall 66 and extends laterally (e.g., along the lateral axis 26) between a first side wall 88 and a second side wall 90 of the baling chamber 14. The sealing frame 82 is coupled to a ramp 86 (e.g., an inclined structure) extending vertically upward (e.g., along the vertical axis 30) from the first wall 66 and extending from the first side wall 88 to the second side wall 80. As shown, the ramp extends laterally 26 across the baling chamber 14. However, in alternate embodiments, the ramp 86 may be two separate ramps (e.g., non-contacting ramps) positioned on opposite lateral sides of the baling chamber 14 and configured to support the sealing frame 82.

Although one spool 74, one strap feeding assembly 78, and one sealing device 84 are shown in FIG. 3 for clarity, it should be understood, in certain embodiments, that multiple sets of these components may be provided within the baler 10 to surround the bale with multiple straps 76. For example, as shown in FIG. 3, the spool 74, the strap feeding assembly 78, and the sealing device 84 are aligned with the first track 56a. However, a separate spool 74, strap feeding assembly 78, and sealing device 84 may be provided and aligned with each of the tracks 56. Thus, multiple straps 76 may be directed or routed through the tracks 56 and slots 30 to facilitate strapping the bale, as described in more detail below. Additionally, each of the sealing devices 84 may be coupled to the sealing frame 82. In some embodiments, each of the spools 74 and/or the strap feeding assemblies 78 may also be coupled to the sealing frame 82. Moreover, the components coupled to the sealing frame 82 of the sealing assembly 80 (e.g., the sealing device 84, the strap feeding assembly 78, and/or the spool 74) may move relative to the baling chamber 14 with the sealing frame 82.

As noted above, although the illustrated embodiments show systems for strapping the bale about the lateral axis 26 of the baler 10, it should be understood that the systems disclosed herein may be readily adapted for strapping the bale about the longitudinal axis 28 and/or the vertical axis 30. For example, to strap the bale about the vertical axis 30, the slots 38 may extend across the material-facing surface 36 of the forward plunger 32 such that the slots 38 are aligned with the lateral axis 26 of the baler 10 and are parallel to the top end 40 and to the bottom end 42 of the forward plunger 32. Similarly, the tracks 56 may extend across the rear door 52 such that the tracks 56 are aligned with the lateral axis 26 of the baler 10 and are parallel to the top end 58 and to the bottom end 60 of the rear door 52. In such configurations, each strap 76 may be propelled through the slot 38 extending laterally across the forward plunger 32 and through the track 56 extending laterally across the rear door 52. Additionally, in such configurations, rather than tracks 56 being formed in the top wall 66 and in the bottom wall 68, the tracks 56 may extend along the first side wall 88 and along the second side wall 90 of the baling chamber 14 between the forward plunger 32 and the rear door 52. Furthermore, in such cases, the spool 74, the strap feeding assembly 78, and/or the sealing assembly 80 may be disposed on the first side wall 88 of the baling chamber 14, for example. The components may function together to surround the bale with the strap 76 about the vertical axis 30 of the baler 10 and the components and system may be oriented and adapted for strapping the bale about the vertical axis 30.

The strap 76 may be formed from any suitable relatively high-strength material. For example, the strap 76 may have a strength of about 150 kilograms-force (kgf) to about 1500 kgf. In some embodiments, the strap 76 may have a strength of about 300 kgf to about 1200 kgf. In certain embodiments, the strap 76 may be formed from carbon steel, stainless steel, aluminum, or plastics, such as polypropylene or polyester. The strap 76 may have any suitable cross-sectional geometry and may have any suitable width or diameter. For example, the strap 76 may be a band or a belt having a substantially polygonal (e.g., square or rectangular) cross-sectional shape with a width of between approximately 1 centimeter (cm) and about 8 cm. By way of another example, the strap 76 may be a wire having a substantially round or circular cross-sectional shape with a diameter between approximately 2 millimeters (2 mm) and 6 mm, in some embodiments. In some embodiments, the baler 10 is configured to form bales that are about 2 to about 3 meters long (along the longitudinal axis 28) by about 1 to about 2 meters wide (along the lateral axis 26) by about 0.5 to about 1 meters tall (along the vertical axis 30), and the strap 76 is of a suitable strength to securely strap bales of this size.

Additionally, the baler 10 depicted in FIG. 3 includes a needle 92, which may be generally disposed adjacent to the second wall 68 of the baling chamber 14. The needle 92 is configured to move through the baling chamber 14, and in some embodiments, the needle 92 may move through the baling chamber 14 along an arcuate path. In the illustrated embodiment, the needle 92 is configured to rotate about an attachment 94 coupled to a first end 96 of the needle 92. Additionally, in certain embodiments, the needle 92 may be coupled to a gripping assembly 98 disposed generally near (e.g., proximate to) a second end 99 of the needle 92. The gripping assembly 98 of the needle 92 is configured to receive and to grip the strap 76. The needle 92 and the gripping assembly 98 may have any of a variety of configurations and may serve any of a variety of functions, such as transferring the strap 76 to a strap gripper 100. For example, the needle 92 may be configured to transport the strap 76 from the second wall 68 to the first wall 66 of the baling chamber 14 to wrap the strap 76 around the bale and/or to transfer the strap 76 to the strap gripper 100. The strap gripper 100 may then transfer the strap 76 to the sealing assembly 80, as described in more detail below. For example, the strap gripper 100 may receive the strap 76 from the gripping assembly 98 and drive the strap 76 toward the sealing assembly 80. However, in other embodiments, the needle 92 may transfer the strap 76 directly to the sealing device 84 of the sealing assembly 80.

Figure 4:
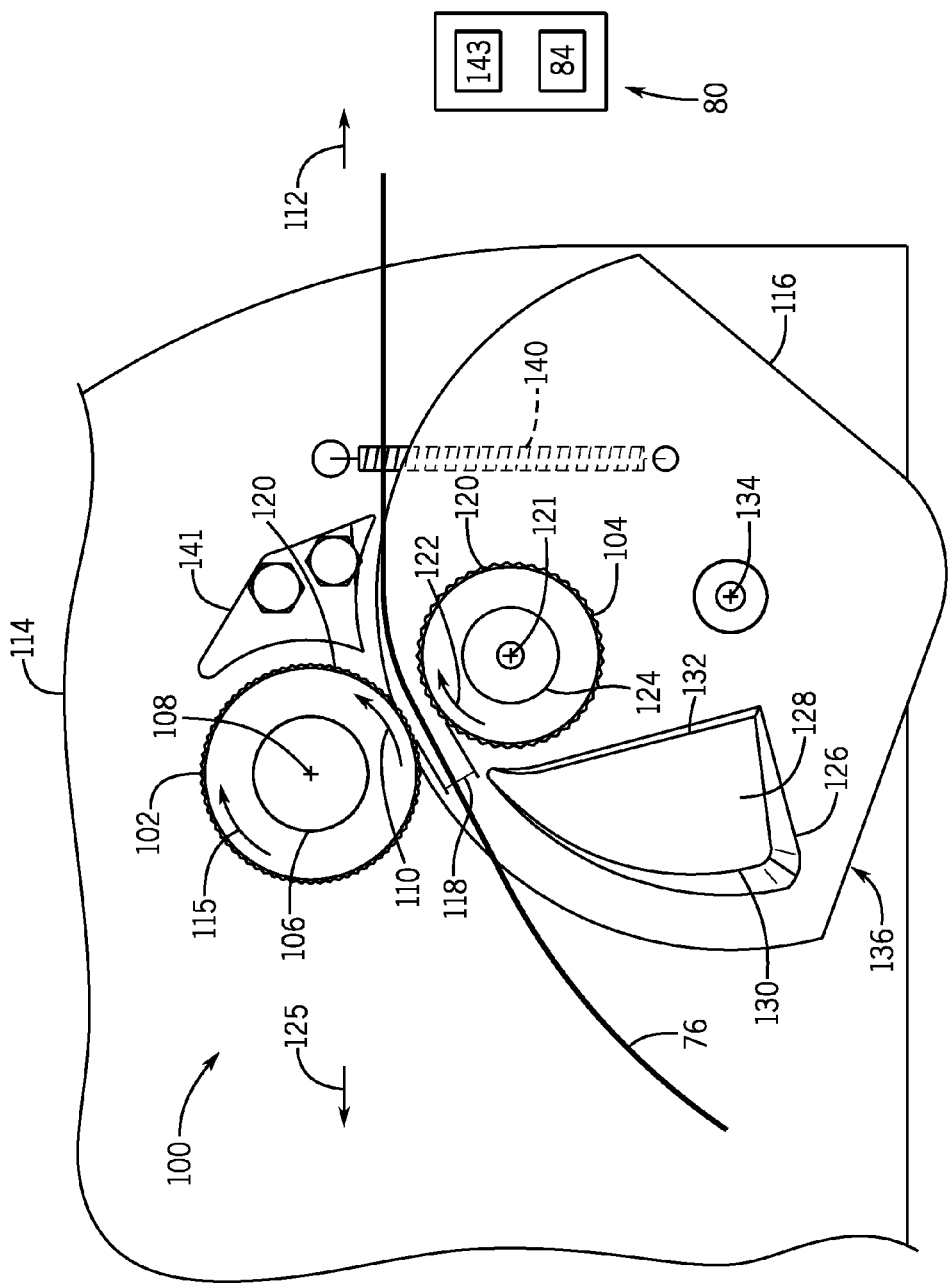
FIG. 4 is a side view of an embodiment of a strap gripper configured to direct a strap to a sealing assembly.

Turning to FIG. 4, a side view of an embodiment of the strap gripper 100 is shown. As mentioned above, the strap gripper 100 receives the strap 76 from the needle 92 after the needle 92 transports the strap 76 to the second side 24 of the baling chamber 14. In some embodiments, the strap gripper 100 is configured to transfer the strap 76 from the needle 92 to the sealing assembly 80. To that end, the strap gripper 100 receives the strap 76 from the needle 92, grips the strap 76 between a drive wheel 102 and a guide wheel 104, and feeds the strap to the sealing assembly 80.

After receiving the strap 76 from the needle 92, contact between the strap 76 and the rotating drive wheel 102 drives the strap toward the sealing assembly 80. In the illustrated embodiment, the drive wheel 102 is coupled to a drive shaft 106, which rotates the drive wheel 102 about a drive wheel axis 108. In some embodiments, the drive shaft 106 is driven to rotate by an electric motor. However, in other embodiments, the drive shaft 106 may be driven to rotate by a gear/pulley system, a hydraulic motor, or the like. In the illustrated embodiment, the drive shaft 106 drives the drive wheel 102 to rotate in a first rotating direction 110. For example, the first rotating direction 110 may be counter clockwise with respect to the drive wheel axis 108. Rotation of the drive wheel 102 in the first rotating direction 110 drives the strap 76 in a direction 112 toward the sealing assembly 80. In some embodiments, the sealing assembly 80 may be positioned adjacent to the strap gripper 100. For example, with reference to FIG. 4, the sealing assembly 80 is to the right of the strap gripper 100. However, it will be appreciated that in alternative embodiments the strap gripper 100 may be flipped so as to drive the strap 76 toward the left of the strap gripper 100.

As described above, the drive shaft 106 drives the drive wheel 102 to rotate in the first rotating direction 110. Moreover, the drive shaft 106 (or the motor driving the drive shaft 106, the gear system coupled to the drive shaft 106, etc.) may block rotation of the drive wheel 102 in a direction opposite the first rotating direction 110. In other words, the drive shaft 106 (or the motor driving the drive shaft 106, the gear system coupled to the drive shaft 106, etc.) may facilitate rotation in only a single direction. For example, in the illustrated embodiment, the drive shaft 106 may block rotation of the drive wheel 102 in the counter clockwise direction through coupling with a one direction motor. However, in other embodiments, the drive shaft 106 may permit rotation of the drive wheel 102 in both the first rotating direction 110 and the opposite direction 115. For example, the motor may be communicatively coupled to a controller that sends a signal to the motor to change the direction of rotation of the drive shaft 106.

In the illustrated embodiment, the drive wheel 102 is positioned on a mounting surface 114. Additionally, a portion of the drive wheel 102 overlaps a pivot plate 116, which is also positioned on the mounting surface 114. The mounting surface 114 includes an aperture through which the drive shaft 106 extends. The drive wheel 102 is in close proximity to the guide wheel 104, which is mounted on the pivot plate 116 in the illustrated embodiment. As will be appreciated, a spacing distance 118 between the drive wheel 102 and the guide wheel 104 is large enough to enable the strap 76 to fit between the drive wheel 102 and the guide wheel 104. However, in some embodiments, there may not be any space between the drive wheel 102 and the guide wheel 104 before the strap 76 is transferred to the strap gripper 100. In some embodiments, the strap 76 is compressed between the drive wheel 102 and the guide wheel 104. However, the spacing distance 118 is not so large as to allow the strap 76 to pass between the drive wheel 102 and the guide wheel 104 without contacting at least one of the drive wheel 102 or the guide wheel 104. As a result, when the strap 76 contacts the drive wheel 102, the rotation of the drive wheel 102 is transferred to the strap 76 to drive and direct the strap 76 in the direction 112 toward the sealing assembly 80. In other words, the rotational movement of the drive wheel 102 drives the strap 76 toward the sealing assembly 80.

As mentioned above, contact between the drive wheel 102 and the strap 76 drives the strap 76 in the direction 112 toward the sealing assembly 80. In the illustrated embodiment, the drive wheel 102 includes a textured surface 120 to facilitate gripping of the strap 76 by the drive wheel 102. For example, the textured surface 120 may include knurling, grit, or the like to create a rough surface that enables the drive wheel 102 to grip the strap 76 and to transfer rotational energy from the drive wheel 102 to the strap 76. For example, in embodiments in which the textured surface 120 includes knurling, the teeth of the knurling may dig into the strap 76 to reduce slippage and/or to facilitate the transfer of the rotational movement of the drive wheel 102 to the strap 76 to direct the strap 76 in the direction 112 toward the sealing assembly 80.

As discussed above, the guide wheel 104 is positioned on the pivot plate 116. The guide wheel 104 secures the strap against the drive wheel 102 to enable the drive wheel to drive and to direct the strap 76 toward the sealing assembly 80. As described above, when the strap gripper 100 receives the strap 76 from the needle 92, the strap 76 is fed between the drive wheel 102 and the guide wheel 104. Similar to the drive wheel 102, the guide wheel 104 includes a textured surface 120. In the illustrated embodiment, the guide wheel 104 rotates about a guide wheel axis 121 in a second rotating direction 122. The second rotating direction 122 is opposite the first rotating direction 110. For example, when the first rotating direction 110 is counter clockwise the second rotating direction 122 is clockwise. To block rotation of the guide wheel 104 in the first rotating direction 110, the strap gripper 100 includes a bearing assembly 124. In some embodiments, the bearing assembly 124 is a one direction bearing that facilitates rotation in one direction but blocks rotation in the opposite direction. However, in other embodiments, the bearing assembly 124 may include a ratchet and pawl, sprag clutch, or other rotation mechanism that facilitates rotation in one direction and blocks rotation in an opposite direction. Because the bearing assembly 124 blocks rotation in a direction 125 opposite the second rotating direction 122, the strap 76 is blocked from traveling in the direction 125 opposite the direction 112. In other words, by blocking rotation in the direction 125 opposite the direction 112, the strap gripper 100 may block the strap 76 from being pulled away from the sealing assembly 80.

Figure 5:
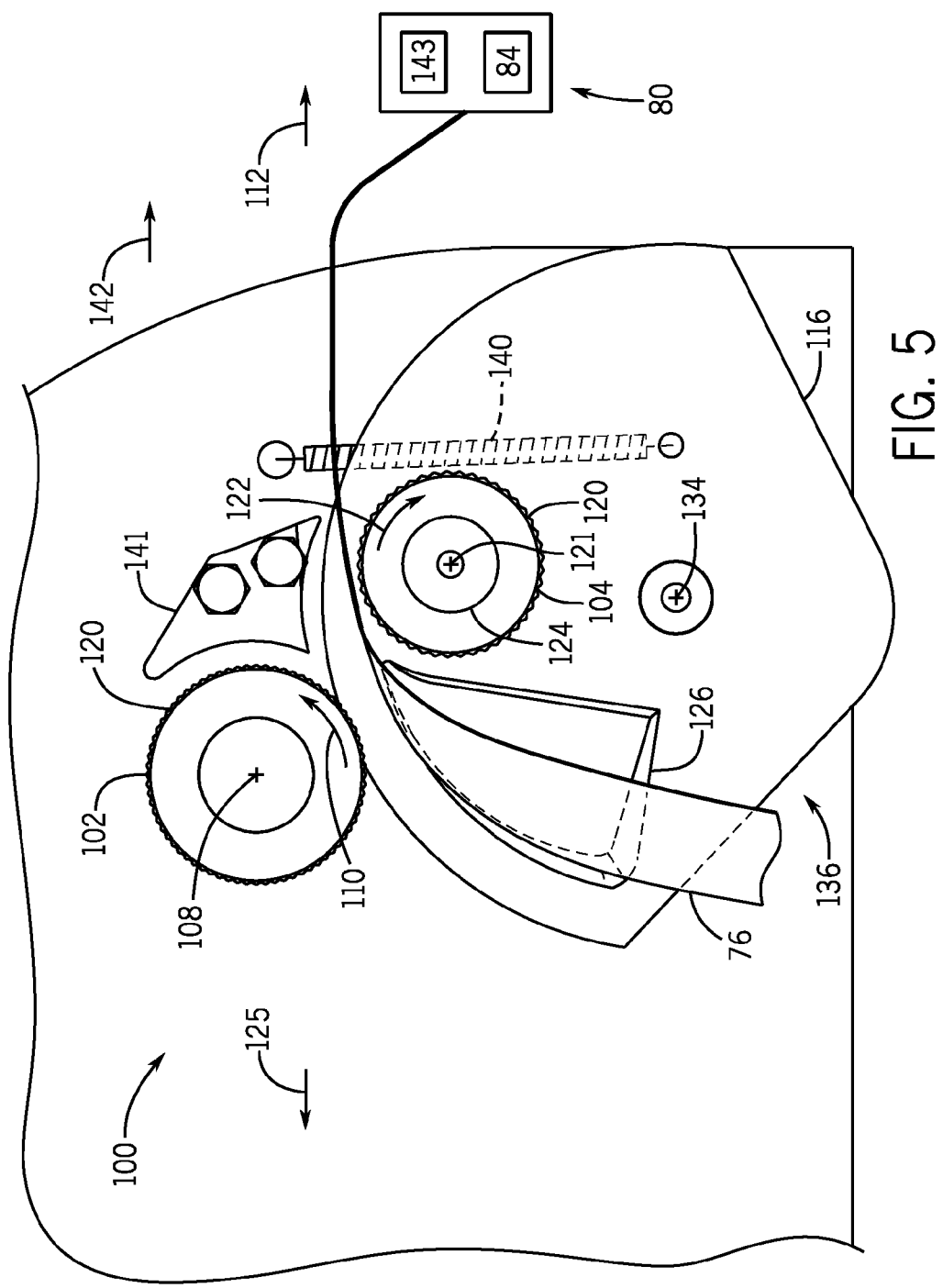
FIG. 5 is a side view of the strap gripper of FIG. 4, in which a pivot plate is in a release position.

In the illustrated embodiment, the strap gripper 100 includes the pivot plate 116, as mentioned above. The pivot plate 116 is mounted to the mounting surface 114 and configured to rotate or pivot about a pivot plate axis 134. The pivot plate 116 may rotate in both the first rotating direction 110 and the second rotating direction 122. In other words, the pivot plate 116 may rotate in both the clockwise and counter clockwise directions about the pivot plate axis 134. As shown in FIG. 4, the pivot plate 116 is in an engagement position 136 when the strap 76 is transferred to the strap gripper 100. That is, the pivot plate 116 (and as a result, the strap gripper 100) is in the engagement position 136 when the drive wheel 102 is proximate the guide wheel 104. In other words, when in the engagement position, the drive wheel 102 and guide wheel 104 are configured to receive the strap 76 and drive the strap 76 toward the sealing assembly 80. Moreover, the pivot plate 116 may rotate in the second rotating direction 122 to a release position 138 (as shown in FIG. 5). Furthermore, the strap gripper 100 includes a biasing member 140 configured to urge the pivot plate 116 to rotate in the second rotating direction 112 about the pivot plate axis 134. As described in detail below, the biasing member 140 urges the pivot plate 116 to rotate to the engagement position 136 after the pivot plate 116 rotates to the release position 138. In the illustrated embodiment, the biasing member 140 is a spring coupled between the pivot plate 116 and the mounting surface 114. In some embodiments, the biasing member 140 may be a coil spring mounted about the pivot plate axis 134. For example, the spring may be configured to bias the pivot plate 116 to rotate in the first rotating direction 110 (i.e., toward the engagement position 136). As a result, the guide wheel 104 is urged against the drive wheel 102, thereby capturing the strap 76.

Figure 6:
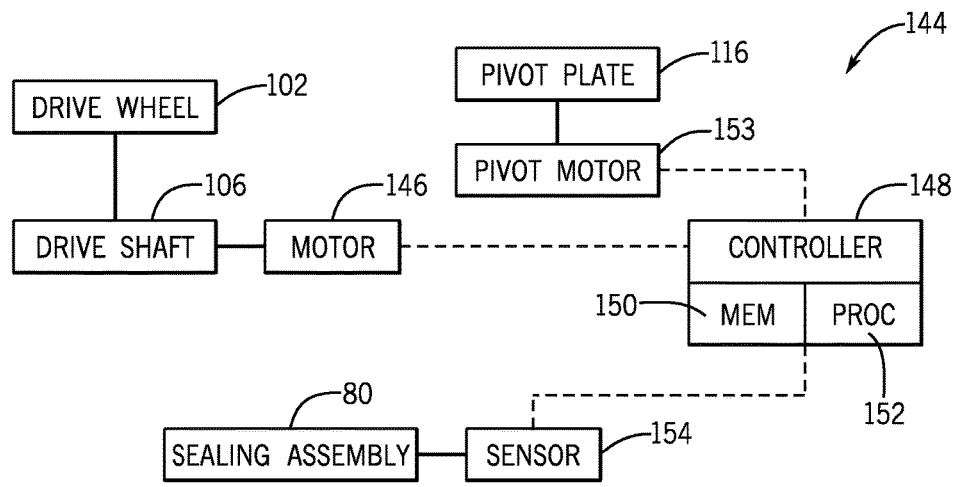
FIG. 6 is a schematic diagram of an embodiment of a strap transfer system that may be employed within the baler of FIG. 3.

As described in detail below, in other embodiments the pivot plate 116 is coupled to a pivot motor 153 (as shown in FIG. 6). The pivot motor 153 is configured to pivot or rotate the pivot plate 116 about the pivot plate axis 134. For example, the pivot motor 153 may rotate the pivot plate 116 in the first rotating direction 110 and the second rotating direction 122. As will be appreciated, the pivot motor 153 may replace the biasing member 140 for rotating the pivot plate 116 in the first rotating direction 110. Also, as will be discussed below, the pivot motor 153 may rotate the pivot plate 116 to the release position 138 and back to the engagement position 136. As discussed above, the baler 10 may include several strap grippers 100. In some embodiments, each strap gripper 100 includes the pivot motor 153. As a result, each strap gripper 100 may be moved to the release position 138 independent of the other strap grippers 100. However, in alternative embodiments, a common shaft may couple the strap grippers 100 to a single pivot motor 153.

The strap gripper 100 also includes a release guide 126 mounted on the pivot plate 116, in the illustrated embodiment. As shown, the release guide 126 is mounted adjacent to the guide wheel 104 and beneath the drive wheel 102. As a result, the release guide 126 may be in contact with the strap 76 as the strap 76 is driven in the direction 112 toward the sealing assembly 80. However, in some embodiments, the strap 76 may not contact the release guide 126 while the drive wheel 102 is driving the strap 76 toward the sealing assembly 80. The release guide 126 has a sloped surface 128 in the disclosed embodiment. That is, the first edge 130 is higher relative to the pivot plate 116 than the second edge 132. As described in detail below, the release guide 126 facilitates rotation of the pivot plate 116 between an engagement position and a release position.

The strap gripper 100 also includes a strap guide 141 positioned adjacent to the drive wheel 102. In the illustrated embodiment, the strap guide 141 directs the strap 76 toward the sealing assembly 80. For example, the strap guide 141 contacts the strap 76 to encourage movement of the strap in the direction 112, thereby reducing the possibility of the strap 76 curling up (e.g., toward the drive wheel 102). In other words, the strap guide 141 keeps the strap 76 directed toward the sealing assembly 80.

In some embodiments, the pivot plate 116 moves to the release position 138 from the engagement position 136 when the strap 76 is transferred to the sealing assembly 80. As used herein, transferring the strap 76 to the sealing assembly 80 may include transferring the strap 76 to a gripper 143 of the sealing assembly 80 or transferring the strap 76 to the sealing device 84. For example, the pivot plate 116 may move to the release position 138 when the strap 76 reaches the gripper 143 in the sealing assembly 80. The gripper 143 may provide sufficient force to move the pivot plate 116 to the release position 138. Moreover, the controller may send a signal to the pivot motor 153 to rotate the pivot plate 116 to the release position when the strap 76 engages with the gripper 143. In other embodiments, movement along the sealing frame 82 while the strap 76 is engaged with the gripper 143 may provide the force to move the pivot plate 116 to the release position 138. However, in other embodiments, the pivot plate 116 may move to the release position 138 after the strap 76 reaches the sealing device 84 and sealing of the strap 76 beings. For example, as mentioned above, the sealing device 84 may move along the sealing frame 82. The movement of the sealing device 84 along the frame 82 may move the pivot plate 116 to the release position 138. That is, the strap 76 may be engaged with the sealing device 84 and the movement of the sealing device 84 along the frame 82 would apply a force to the strap 76 to drive the pivot plate 116 to the release position 138. However, in embodiments that include the pivot motor 153, the pivot motor 153 may move the pivot plate 116 to the release position 138. For example, the pivot motor 153 may rotate the pivot plate 116 about the pivot plate axis 134 to the release position 138 when the sealing device 84 engages the strap 76.

FIG. 5 is a side view of the pivot plate 116 in the release position 138. Contact between the strap 76 and the release guide 126 generates the force to move the pivot plate 116 to the release position 138 from the engagement position 136 in the depicted embodiment. That is, the release guide 126 blocks movement of the strap 76 relative to the pivot plate, thereby transferring the force applied to the strap 76 to the pivot plate 116. As a result, the pivot plate 116 rotates in the second rotating direction 122 from the engagement position 136 to the release position 138. In some embodiments, as mentioned above, the sealing assembly 80 applies a release force 142 to the strap 76. For example, the release force 142 may result from the strap 76 engaging with the gripper 143. In some embodiments, the release force 142 pulls the strap 76 at a downward angle 145 (e.g., 10 degrees, 30 degrees, etc.) relative to the sealing assembly direction 112. However, in other embodiments, the release force 142 may come from the movement of the sealing assembly 80 along the sealing frame 82. Similar to the release force 142 from the gripper 143, the strap 76 may be pulled at a downward angle 145 relative to the sealing assembly direction 112. The release force 142 drives the strap 76 to contact the sloped surface 128 of the release guide 126. Moreover, in other embodiments, the release force 142 may be the result of engagement with the sealing device 84. In the depicted embodiment, the contact with the release guide 126 blocks movement of the strap 76 in the direction 112. In some embodiments, the drive wheel 102 may still be applying force to the strap 76 (e.g., through rotational movement in the first rotating direction 110) after the strap 76 engages with the sealing assembly 80. Moreover, the strap 76 may twist or bend along the sloped surface 128 of the release guide 126, thereby directing the strap 76 away from the drive wheel 102. As described above, the sealing assembly 80 may provide the force sufficient to continue the extraction of the strap 76 from the strap gripper 100. In some embodiments, the sealing assembly 80 may include a cutting device that cuts the strap 76 after the transfer from the strap gripper 100 to the sealing assembly 80. Once the strap 76 is released, the biasing member 140 drives the pivot plate 116 to rotate to the engagement position 36. In other embodiments, as mentioned above, the pivot motor 153 drives the pivot plate 116 to the release position 138. Moreover, the pivot motor 153 may drive the pivot plate 116 back to the engagement position 136. The strap 76 illustrated in FIGS. 4 and 5 has a generally rectangular cross-sectional shape. However, as discussed above, the strap 76 may have any of a variety of cross-sectional shapes, such as a generally round or circular cross-sectional shape. Thus, in certain embodiments, the strap gripper 100 may be adapted to receive, contain, guide, and/or release the strap 76 having any of a variety of cross-sectional shapes in the manner disclosed herein. For example, the geometry of the release guide 126 may be configured to accommodate straps 76 of one or more various cross-sectional shapes.

FIG. 6 is a schematic diagram of an embodiment of a strap transfer system 144. As previously mentioned, the baler 10 includes a drive shaft 106 that applies a rotational force to the drive wheel 102. The drive shaft 106 is coupled to a motor 146 (e.g., electric motor, hydraulic motor, gas engine, etc.) that rotates the drive shaft 106. In the illustrated embodiment, the motor 146 receives an operating signal from a controller 148. For example, the operating signal may instruct the motor to rotate the drive shaft 106 in the first rotating direction 110. Moreover, the operating signal may instruct the motor to stop rotation of the drive shaft 106. In the depicted embodiment, the controller includes a memory 150 and a processor 152. The memory 150 may be any type of non-transitory machine readable medium for storing data and executable instructions, such as random-access memory, read-only memory, rewritable flash memory, hard drives, optical discs, and the like. The processor 152 may execute instructions stored on the memory 150. For example, the memory 150 may contain machine readable code, such as instructions, that may be executed by the processor 152. In some embodiments, the memory 150 and the processor 152 may enable automatic (e.g., processor/memory controlled) start up and shut down of the motor 146. The illustrated strap transfer system 144 also includes the pivot motor 153 coupled to the pivot plate 116. As mentioned above, the pivot motor 153 drives the pivot plate 116 to rotate in the first rotating direction 110 and the second rotating direction 122. In the illustrated embodiment, the pivot motor 153 receives the operating signal from the controller 148. For example, the operating signal may cause the pivot motor 153 to rotate the pivot plate 116 to the release position 138.

As mentioned above, the sealing assembly 80 may include a sensor 154. In some embodiments, the sensor 154 detects if the strap 76 has been transferred to the sealing assembly 80. For example, the sensor 154 may detect whether the strap 76 engages with the gripper 143. However, in other embodiments the sensor 154 may monitor the sealing process. For example, the sensor 154 may detect whether the strap 76 is successfully sealed to another piece of the strap 76 or detect whether the strap 76 has been cut. Furthermore, the sensor 154 may detect whether the sealing device 84 has begun movement along the sealing frame 82. Moreover, the sensor 154 may output a control signal to the controller 148. For example, the sensor 154 may send the control signal to the controller 148 indicating that the strap 76 has been cut by the sealing assembly 80. In some embodiments, the sensor 154 may send the control signal to the controller 148 indicating that the gripper 143 has engaged with the strap 76 or that the sealing device 84 has begun movement along the sealing frame 82. Thereafter, the controller 148 may send the operating signal to the motor 146 to stop rotating the drive shaft 106. In this manner, the strap transfer system 144 may stop supplying the strap 76 through the strap gripper 100 after the transfer and/or sealing process is complete.

In other embodiments, the controller 148 sends the operating signal to the pivot motor 153 based on inputs from the sensor 154. For example, the sensor 154 may detect whether the strap 176 engages with the gripper 143. If the sensor 154 detects engagement, the sensor 154 sends the control signal to the controller 148. The controller 148 then sends the operating signal to the pivot motor 153 instructing the pivot motor 153 to rotate the pivot plate 116 to the release position. Additionally, the sensor 154 may detect when the strap 76 is cut and send the control signal to the controller 148. Then, the controller 148 sends the operating signal to the pivot motor 153 to rotate the pivot plate 116 to the engagement position 136.

In other embodiments, the strap transfer system 144 may include a time delay feature. For example, the time delay feature may be programmed instructions on the memory 150 executed by the processor 152. The time delay feature may be configured to instruct the controller 148 to send the operating signal to the motor 146 to stop rotating the drive shaft 106 when a predetermined time has passed. For example, the sensor 154 may detect that the strap 76 is engaged with the gripper 143 and send the control signal to the controller 148. In other embodiments, the sensor 154 may detect that the strap 76 is being sealed to another end of the strap 76. Based on the signal from the sensor 154, the time delay feature may begin counting a period of time (e.g., 1 second, 3 seconds, 5 seconds, etc.). After the period of time is reached, the controller 148 may send the operating signal to the motor 146 to stop rotating the drive shaft 106. Moreover, the time delay feature may be configured to regulate operation of the pivot motor 153. For example, the sensor 154 may detect the strap 76 is engaged with the gripper 143 or being sealed in the sealing device 84 and send the control signal to the controller 148. Based on the signal from the sensor 154, the time delay feature may begin counting a period of time, as described above. After the period of time is reached, the controller 148 may send the operating signal to the pivot motor 153 to rotate the pivot plate 116 to the release position 138.

As described above, the baler 10 may include several strap feeding assemblies 78 and needles 92. Accordingly, any number of strap grippers 100 may be included. For example, a single drive shaft 106 may drive multiple drive wheels 102. Similarly, multiple strap grippers 100 may be disposed along the length of the drive shaft 106 directing straps 76 to corresponding sealing assemblies 80.

Figure 7:
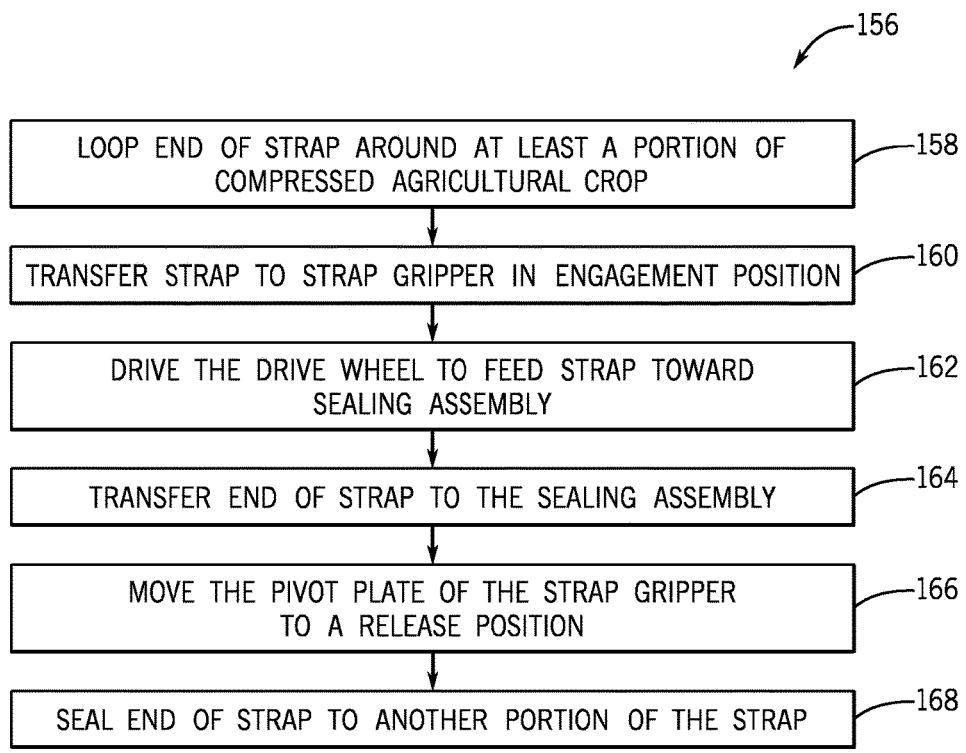
FIG. 7 is a flow chart of an embodiment of a method for transferring the strap from the strap gripper to a sealing assembly.

FIG. 7 is a flow chart of a method 156 for baling an agricultural crop material by transferring the strap 76 from the strap gripper 100 to the sealing assembly 80. An end of the strap 76 is looped around at least a portion of agricultural material at block 158. For example, the strap 76 may loop around the material via the tracks 56 in the baling chamber 14. In the illustrated embodiment, the end of the strap 76 is transferred to the strap gripper 100 at block 160. As mentioned above, the needle 92 transfers the strap 76 to the strap gripper 100 when the strap gripper 100 is in the engagement position 136. The drive wheel 102 is driven by the drive shaft 106 to feed the end of the strap 76 toward the sealing assembly at block 162. For example, in some embodiments, the motor 146 applies torque to the drive shaft 106, and the drive shaft 106, in turn, drives the drive wheel 102 to rotate. Rotation of the drive wheel 102 directs the strap 76 in the direction 112 toward the sealing assembly 80. The strap 76 is transferred to the sealing assembly 80 at block 164. As mentioned above, the strap 76 may engage the gripper 143 or the sealing device 84 of the sealing assembly 80. The pivot plate 116 of the strap gripper 100 moves to the release position at block 166. As mentioned above, the pivot plate 116 rotates from the engagement position 136 to the release position 138 about the pivot plate axis 134. For example, the strap 76 may be acted on by the release force 142, thereby applying a force to the release guide 126. As a result, the pivot plate 116 rotates against the bias. Then, the end of the strap 76 is sealed to another portion of the strap 76 (e.g., a portion already looped around the agricultural material) via the sealing assembly 80 at block 168.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural baler comprising:
a sealing assembly positioned adjacent to a baling chamber, wherein the sealing assembly is configured to receive a strap and to seal the strap into a loop around compressible material within the baling chamber to form a strapped bale; and
a strap gripper positioned adjacent to the sealing assembly, wherein the strap gripper comprises a pivot plate, a guide wheel rotatably coupled to the pivot plate, and a drive wheel, wherein the pivot plate is biased to rotate about an axis in a first direction to urge the guide wheel toward the drive wheel, and the drive wheel and the guide wheel are configured to receive the strap after the strap is looped around the compressible material, to block movement of the strap away from the sealing assembly, and to drive the strap toward the sealing assembly.

2. The agricultural baler of claim 1, wherein the pivot plate is configured to rotate about the axis in a second direction, opposite the first direction, to a release position that separates the guide wheel from the drive wheel when the strap is transferred to the sealing assembly.

3. The agricultural baler of claim 2, further comprising a release guide coupled to the pivot plate and positioned adjacent to the guide wheel, wherein movement of the strap at an angle across the release guide drives the pivot plate to rotate in the second direction to release the strap from between the drive wheel and guide wheel.

4. The agricultural baler of claim 1, wherein the drive wheel is coupled to a drive shaft configured to drive the drive wheel to rotate about a drive wheel axis, and rotation of the drive wheel drives the strap toward the sealing assembly.

5. The agricultural baler of claim 4, further comprising a plurality of strap grippers disposed along a lateral axis of the agricultural baler, wherein rotation of the drive shaft drives a respective plurality of drive wheels to rotate.

6. The agricultural baler of claim 1, wherein the drive wheel and the guide wheel each comprise a textured surface configured to grip the strap.

7. The agricultural baler of claim 1, wherein the drive wheel is further configured to rotate in a first rotating direction to drive the strap toward the sealing assembly, and the strap gripper comprises a bearing assembly configured to facilitate rotation of the guide wheel in a second rotating direction, opposite the first rotating direction, and to block rotation of the guide wheel in the first rotating direction.

8. The agricultural baler of claim 7, wherein the bearing assembly comprises a one direction bearing, a ratchet and pawl, or a sprag clutch.

9. The agricultural baler of claim 1, further comprising a biasing member configured to bias the pivot plate to rotate about the axis in the first direction.

10. The agricultural baler of claim 1, wherein the strap is a wire having a substantially round cross-sectional shape.

* * * * *